United States Patent [19]

Roetling

[11] Patent Number: 4,730,221

[45] Date of Patent: Mar. 8, 1988

[54] SCREENING TECHNIQUES BY IDENTIFICATION OF CONSTANT GREY COMPONENTS

[75] Inventor: Paul G. Roetling, Ontario, N.Y.

[73] Assignee: Xerox Corporation, Stamford, Conn.

[21] Appl. No.: 919,521

[22] Filed: Oct. 16, 1986

[51] Int. Cl.$^4$ .......................... H04N 1/40; H04N 1/22

[52] U.S. Cl. .................................... 358/298; 358/283; 358/300; 358/285

[58] Field of Search ............... 358/296, 298, 280, 285, 358/300, 302, 283

[56] References Cited

U.S. PATENT DOCUMENTS 4,051,536 9/1977 Roetling ............................. 358/298
4,210,936 7/1980 Cinque et al. ....................... 358/298

Primary Examiner—E. A. Goldberg
Assistant Examiner—Linda M. Peco
Attorney, Agent, or Firm—Ronald F. Chapuran

[57] ABSTRACT

Identification of constant grey components in electronic screening by first determining from the continuous-tone input, the maximum value of grey, the minimum value of grey and the average value. The average value is used to determine how many white bits are to be turned on in the halftone dot generated. Since "Moire" problems only occur only from the fluctuating part of the input, the three grey ranges corresponding to the minimum, the maximum and the fluctuating portions of the grey found in the area are then treated separately. The minimum and maximum grey levels identify constant levels within the grey area. That is, every point is at least as light as the minimum and every point is no lighter than the maximum. A template black dot corresponding to the amount of black in the maximum light grey area is generated and correspondingly a template white dot corresponding in size to that for the minimum grey level is generated, and compared to those actual dots created by ordinary halftoning. The ordinary halftone process produces black in at least the area of the template black dot and white in at least the area of the template white dot. The fluctuating grey levels between these two control the remaining dot area as to which is black and which is white.

3 Claims, 9 Drawing Figures

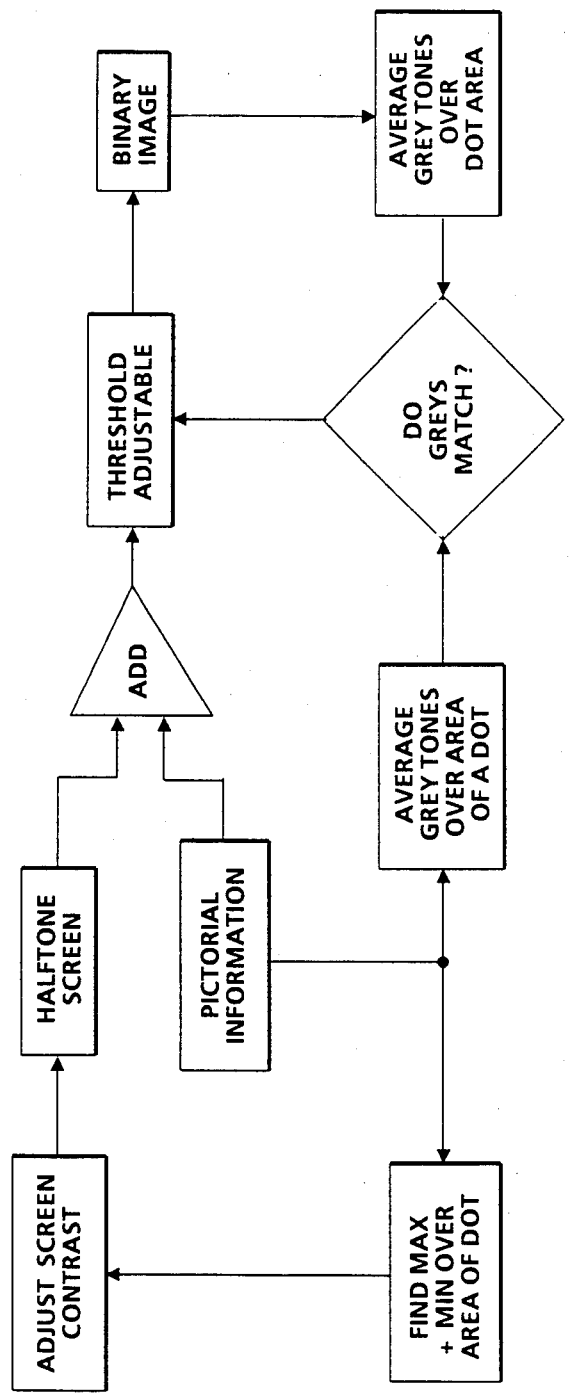
(PRIOR ART) FIG. 1B

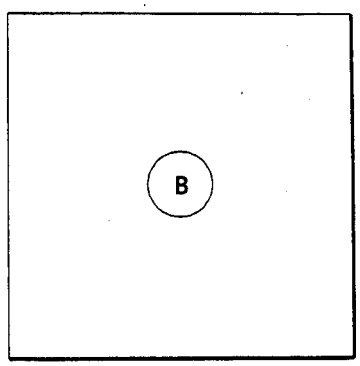
FIG. 2a
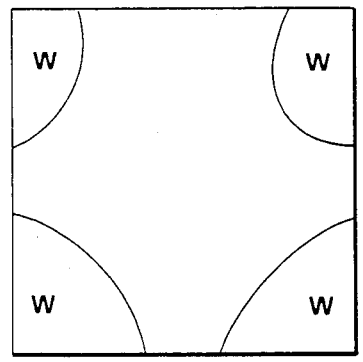
FIG. 2b
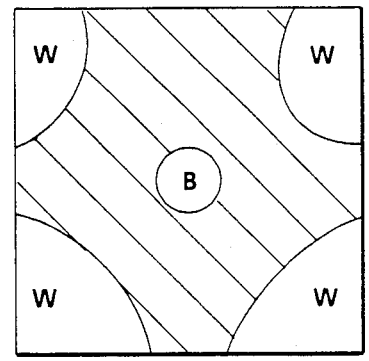
FIG. 2c
FIG. 3a
FIG. 3b

SCREENING TECHNIQUES BY IDENTIFICATION OF CONSTANT GREY COMPONENTS

This invention relates generally to an electronic halftoning system for reproducing images and more specifically to a system for edge enhancement and noise reduction.

BACKGROUND OF THE INVENTION

Halftone images are commonly used in printed material, and now additionally in computer displays, to represent continuous-tone images in systems where only two levels (usually black and white) can be represented at any point. The term halftone, or equivalently binary image, means an image formed by black dots of various sizes so as to give the effect of continuous tone when viewed at normal reading distance. This definition includes the digital case where each black or white spot is a fixed size in an array, such that the variable size dots are generated by turning several adjacent spots black; as well as the case where the spots are not grouped together, but alternated to reduce the visibility of the patterns.

A common method of producing a halftone image is the use of a screen consisting of a pattern which has the same fundamental frequency in two orthogonal directions. The halftone screen is combined with the pictorial information. In a photographic method this involves imaging the picture through the screen, thus multiplying the transmittances. In most electronic systems, the screen and pictorial information are added. It should also be noted that in a digital system both the screen information and the pictorial information are sampled functions.

When the screen is periodic, the fundamental period of the screen is substantially larger than the sample interval, giving many samples per period. For both photographic and digital methods the combined pictorial and screen information is next subjected to a threshold. This is accomplished by recording on a high-contrast film for photographic halftoning or by a numerical comparison for digital halftoning. In either case, the result of the threshold operation is to produce a binary image.

In the usual method, the threshold is a fixed value and adjustment of the screen pattern (including so-called bump and flash exposures in the photographic case) is used to adjust the effective grey scale of the halftone as desired. This process results in dots of varying size, shape, and location within their repetitive pattern. In the digital case, each sample of the halftone screen and corresponding sample of the pictorial information are combined and result in one bit, which is then printed either black or white at a given location. Since there are a number of samples within each cycle of the halftone screen, several adjacent bits normally combine to give the effect of a single halftone dot with size, shape, and location depending on the pattern of bits.

Most halftone methods do a good job of giving the proper illusion of grey scale for low-spatial-frequency information on the continuous-tone image and partial dots in the halftone allow representation of higher frequency detail when detail contrast is sufficient. When the fine detail is periodic, however, spurious low-frequency patterns occur.

One prior art method for converting a continuous-tone image to a halftone incorporates the capability for both suppression of spurious (aliasing) signals and edge enhancement. The basis of the method for suppression of spurious signals and edge enhancement is to adjust the threshold for each halftone cycle in a manner which guarantees that the resultant halftone image matches the average reflectance of the original image. U.S. Pat. No. 4,051,536 is an example. This approach preserves the characteristics of the original halftone process such as partial dots. In areas of uniform grey in the original, the adjustable threshold will remain constant.

In general, the pictorial information over the area corresponding to one halftone cycle in two dimensions is averaged or else a low-pass filtered value is used, giving only low spatial frequency information in either case for control of the threshold. If grey scale information is to be preserved, this average determines precisely what percentage of the area must be covered by the halftone dot. In a digital system, this is equivalent to the number of bits which must be black of the total number of bits. Starting with the complete area of the binary image over one halftone cycle either all black or all white, the threshold is set at the extreme value to generate this case. The threshold is next adjusted monotonically. Either the total number of bits or dot size is examined during the adjustment process. As soon as the correct dot size is reached, the threshold value is fixed and the binary image is generated for that cycle of the halftone.

One difficulty with the system as taught by U.S. Pat. No. 4,051,536 is that to enhance the edges or get better edge detail, the screen contrast is turned down. It is, therefore, necessary to decide what screen contrast to use since enhancing the edges increases noise. That is, a high contrast screen lowers the noise in the image but provides no additional edge enhancement. Whereas, a low contrast screen enhances the edges but increases noise.

A solution to this dilemma is taught in U.S. Pat. No. 4,633,327 issued on Dec. 30, 1986, and assigned to the same assignee as the present invention. In particular, maximum and minimum detectors are provided to detect maximum and minimum pixel grey levels to dynamically adjust screen amplitude. That is, the screen amplitude is controlled on a dot by dot basis to selectively enhance the original image. There is a higher screen amplitude when the input image contrast is low and a lower screen amplitude when the input image contrast is high. Thus, the partial dots more closely follow image detail at high image contrast, but without enhancing noise in uniform areas. A difficulty with this system, however, is often the observance of "Moire" patterns and noise in the image. The "Moire" patterns were more apparent at higher enhancement levels. Haloes and similar artifacts also occur at edges It is, therefore, an object of the present invention to provide a new and improved screening technique and method of enhancing a digital halftone image. It is another object of the invention to provide for image enhancement and at the same time to limit noise generation and reduce remnant "Moire" patterns and haloes artifacts. Another object of the present invention is to separate the uniform grey components from the fluctuating grey components in the area of each halftone dot.

Further advantages of the present invention will become apparent as the following description proceeds, and the features characterizing the invention will be pointed out with particularity in the claims annexed to and forming a part of this specification.

SUMMARY OF THE INVENTION

Briefly, the present invention is to first determine from the continuous-tone input, the maximum value of grey, the minimum value of grey and the average value. The average value is used to determine how many white bits are to be turned on in the halftone dot generated. Since "Moire" problems only occur only from the fluctuating part of the input, the three grey ranges corresponding to the minimum, the maximum and the fluctuating portions of the grey found in the area are then treated separately. The minimum and maximum grey levels identify constant levels within the grey area. That is, every point is at least as light as the minimum and every point is no lighter than the maximum. A template black dot corresponding to the amount of black in the maximum light grey area is generated and correspondingly a template white dot corresponding in size to that for the minimum grey level is generated, and compared to those actual dots created by ordinary halftoning. The ordinary halftone process produces black in at least the area of the template black dot and white in at least the area of the template white dot. The fluctuating grey levels between these two control the remaining dot area as to which is black and which is white.

For a better understanding of the present invention, reference may be had to the accompanying drawings wherein the same reference numerals have been applied to like parts and wherein:

BRIEF DESCRIPTION OF THE DRAWINGS

FIGS. 1A and 1B are a prior art block diagram and general flow chart illustrating automatic screen control;

FIG. 2 illustrates typical black and white dot templates;

FIG. 3 is an illustration of the separation of the uniform grey components from the fluctuating grey components in accordance with the present invention.

DETAILED DESCRIPTION

Figure 1A:
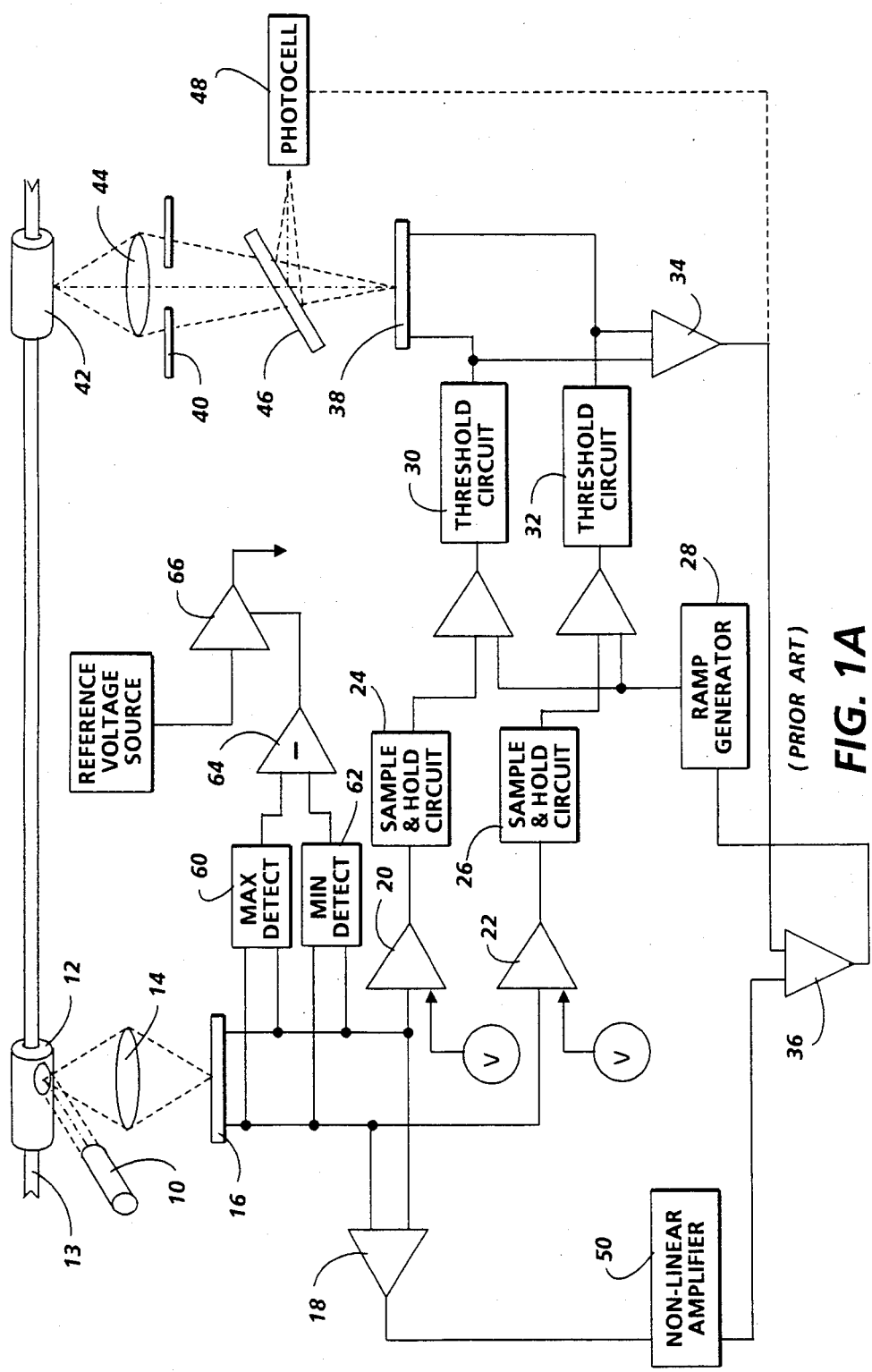

With respect to the prior art, and with reference to FIGS. 1A and 1B, a scanner 10 sequentially illuminates an original image which is attached to the periphery of drum 12 which rotates about shaft 13. Of course, the original image may be a transparency as well as an opaque document. Scanner 10 operates at speeds of a millisecond or less per halftone period covered, though the actual speeds will depend upon the characteristics of the particular optical and electronic components used in any embodiment of the invention.

Each halftone dot period of the original image illuminated by scanner 10 is sequentially imaged by imaging lens 14 onto a light sensitive element 16 such as, for example, a photodiode array. The light sensitive element includes a plurality of light sensitive detectors, one for each discrete element in a halftone period area. Typically, the halftone period area is broken down into at least 5×5 discrete elements. The various intensities of light striking the light sensitive element 16 are dependent upon the densities of the toner in the original image.

The light is transduced by photodiode array 16 into analog electronic signals. The analog electronic signal from each light sensitive detector in photodiode array 16 is fed into summing circuit 18, to be added to give a signal representative of the total amount of light reflected by the halftone dot period.

Alternatively, a beam splitter could be interposed between imaging lens 14 and photodiode array 16 and a portion of the light in the beam directed to a separate photodiode having only a single light sensitive detector. In this case, the light would be transduced into a single electronic signal representative of the total amount of light reflected by the halftone dot period and the electronic signal would replace the output of circuit 18.

The electronic signal from each light sensitive detector in photodiode array 16 is fed into separate summing circuits 20, 22 to be combined with a reference voltage representative of the halftone screen function. For purposes of illustration, the signals from two of the light sensitive detectors in photodiode array 16 are shown; however, it is understood that the electronic signal from each detector is treated in a similar fashion. A different reference voltage, illustrated by $v_i$ and $v_j$ is added to the output signal from the respective detectors in photodiode array 16 by summing circuits 20 and 22, respectively. It is again noted that the values of the respective reference voltages can be varied to control detail contrast.

The signals from the summing circuits are then brought into sample and hold circuits 24 and 26, respectively. These sample and hold circuits are not required if the original image is scanned slowly enough; however, they are preferred since they allow the image to be scanned electronically, that is, at speeds of a millisecond or less per halftone period covered. Each electronic signal at this point represents the sum function of the subcell pictorial information and the halftone screen function. The sum function for each subcell is next added to a dynamically adjusted amplitude varying voltage signal common to all subcells supplied by a single ramp generator 28. Each electronic signal is then directed through fixed level threshold circuits 30 and 32, respectively, to a light emitting diode array 38 which includes as many light emitting diodes as the number of light sensitive detectors in photodiode 16. The light emitting diodes are arranged in a pattern similar to that of the light sensitive detectors in photodiode array 16 which control them.

A maximum detector 60 and a minimum detector 62 are electrically connected to the photodiode array 16 to detect the maximum and minimum pixel grey levels. A difference circuit 64 subtracts the minimum level from the maximum level to provide local image contrast. This image contrast or the signal from circuit 64 controls the gain of a set of amplifiers illustrated at 66. Alternatively, a set of values loaded into look-up tables could be controlled in a digital implementation.

The control of the amplifiers 66 yields a small amplifier gain for a large local image contrast and a large amplifier gain for a small local image contrast. Suitable reference voltages are sent through variable gain amplifier 66 to yield adjusted reference voltages. These adjusted reference voltages $v_i$ and $v_j$ are conveyed to summing circuits 20 and 22.

Not shown, but comprised of well known elements, is a timing mechanism which starts a sequence by triggering the sample and hold circuits 24, 26 to sample the signals from summing circuits 20 and 22, respectively. The timing mechanism starts the ramp generator 28 voltage increasing, thus effectively producing the dynamically varying threshold. The outputs of the threshold circuits 30 and 32 are fed into circuit 34 where they are summed. The signal respresenting the sum is directed into circuit 36 which compares the electronic signal from circuit 34 with the electronic signal from circuit 18. When the two voltage signals match, circuit 36 emits a pulse which stops any further increase of the voltage signal form ramp generator 28.

In operation, the electronic signals representing the sum functions having the largest values will cause the appropriate light emitting diodes in array 38 to become operative until the total light output matches the total amount of light reflected by the original image in the area of the halftone period being examined. The remaining light emitting diodes will not be energized. A short time after these actions the timing mechanism opens shutter 40 momentarily allowing the energized light emitting diodes to expose a photoreceptor 42 through lens 44. The photoreceptor 42 may be any suitable light sensitive recording medium such as a photographic film or a charged xerographic member. In one embodiment, as illustrated, the photoreceptor comprises a charged xerographic drum which rotates about shaft 13 and is matched to the movement of drum 12 which carries the original image. Alternatively, photoreceptor 42 could be moved by another scanner, similar to 10 and matched to it. After the photoreceptor is exposed the timer resets the circuits in the system and starts the next cycle. This sequence is repeated for each halftone period of the original image.

According to the present invention, each halftone cell area is first processed to determine from the continuous-tone input, the maximum value of grey, the minimum value of grey and the average value as done in the prior art. As in the prior art, the average value is used to determine how many white bits are to be turned on in the halftone dot generated. In accordance with the present invention, however, it has been noted that the Moire problems seen in ordinary halftoning occur only from the fluctuating part of the input. Thus, it is possible to identify and treat separately, the three grey ranges corresponding to the minimum, the maximum and the fluctuating portions of the grey found in the area.

The minimum and maximum grey levels identify constant levels within the grey area. That is, every point is at least as light as the minimum and every point is no lighter than the maximum. It is thus possible to generate a template black dot corresponding to the amount of black in the maximum light grey area and correspondingly generate a template white dot corresponding in size to that for the minimum grey level, and compare these dots to those actual dots created by ordinary halftoning. From this it can be found that the ordinary halftone process produces black in at least the area of the template black dot and white in at least the area of the template white dot. The fluctuating grey levels between these two control the remaining dot area as to which is black and which is white.

According to the present invention, therefore, black and white template dots are generated corresponding to the minimum and/or maximum grey values. Any white bits generated are placed appropriately in the halftone dot and subtracted form the total number that need to be generated as computed from the average grey. Any place specified that black must be generated is simply eliminated from the allowable areas in which white bits can be placed. Having finished this operation, the rest of the white bits are placed normally as in the prior art.

With reference to FIGS. 2a, b, and c, there are illustrated typical black and white dot templates. That is, for a typical image area represented by the rectangle in FIG. 2a, the circular interior portion represents a black region or the maximum grey level of the image area. FIG. 2a illustrates in the four corners by the letter W, the minimum grey level areas that have been determined. FIG. 2c is combination of FIGS. 2a and b showing the constant non-fluctuating black and white portions. It is only necessary therefore to be concerned with the remaining fluctuating (shaded) area for grey scale conversion. That is, the area for grey scale conversion is limited to only those fluctuating areas by eliminating the constant or non-fluctuating portions.

FIGS. 3a and 3b illustrate a hypothetical example of an image area with dots with distinct grey scale levels from 0 to 25. FIG. 3a assigns a distinct grey level value for each of the 25 elements in the halftone cell as illustrated. Assuming that the maximum grey level (grey level 23 sets 2 spots to black) and the minimum grey level (grey level 11 turns 14 spots black), leaving 11 spots always white, the dot pattern for this case can be shown. The maximum grey level spots are illustrated as 1 and 2 in FIG. 3a and the white spots set at the minimum grey level are illustrated as numbers 15 through 25 in FIG. 3a. FIG. 3b illustrates the spots set black at the maximum grey level as "B" and those set while at the minimum grey level as "W". The shaded area represents the spots in the halftone cell where the fluctuating values of the image will cause any additional spots to be located in order to reach the proper average grey level. Now, if the average grey level (level 16 has been determined to be such that a total of 9 spots should be black), then 7 of the shaded spots must be set to black and 5 must be set to white by the varying threshold circuits, similar to the known art.

Figure 4A:
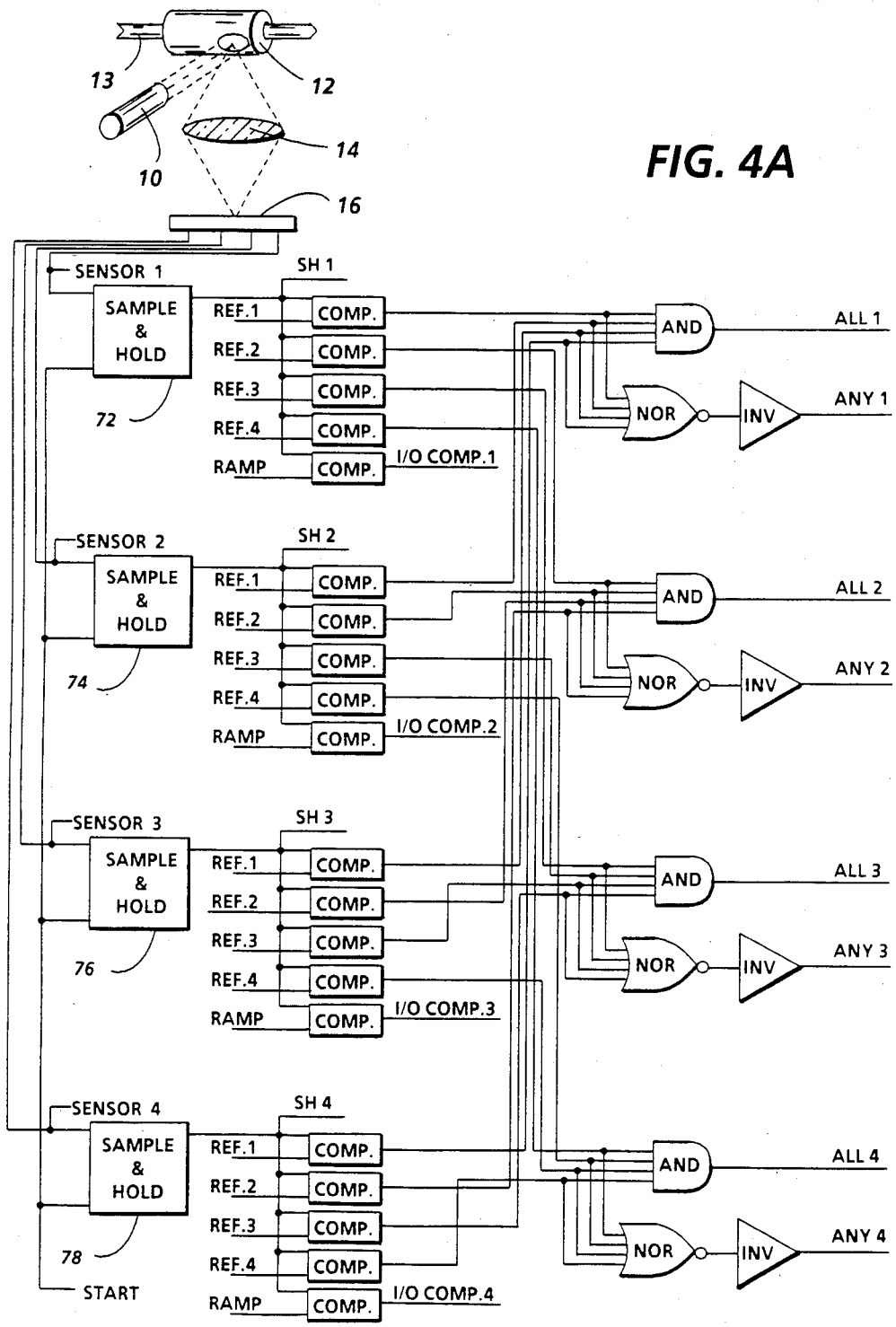
FIGS. 4A and 4B is a schematic diagram of an embodiment of an electronic haltone image screening technique according to the present invention.
Figure 4B:
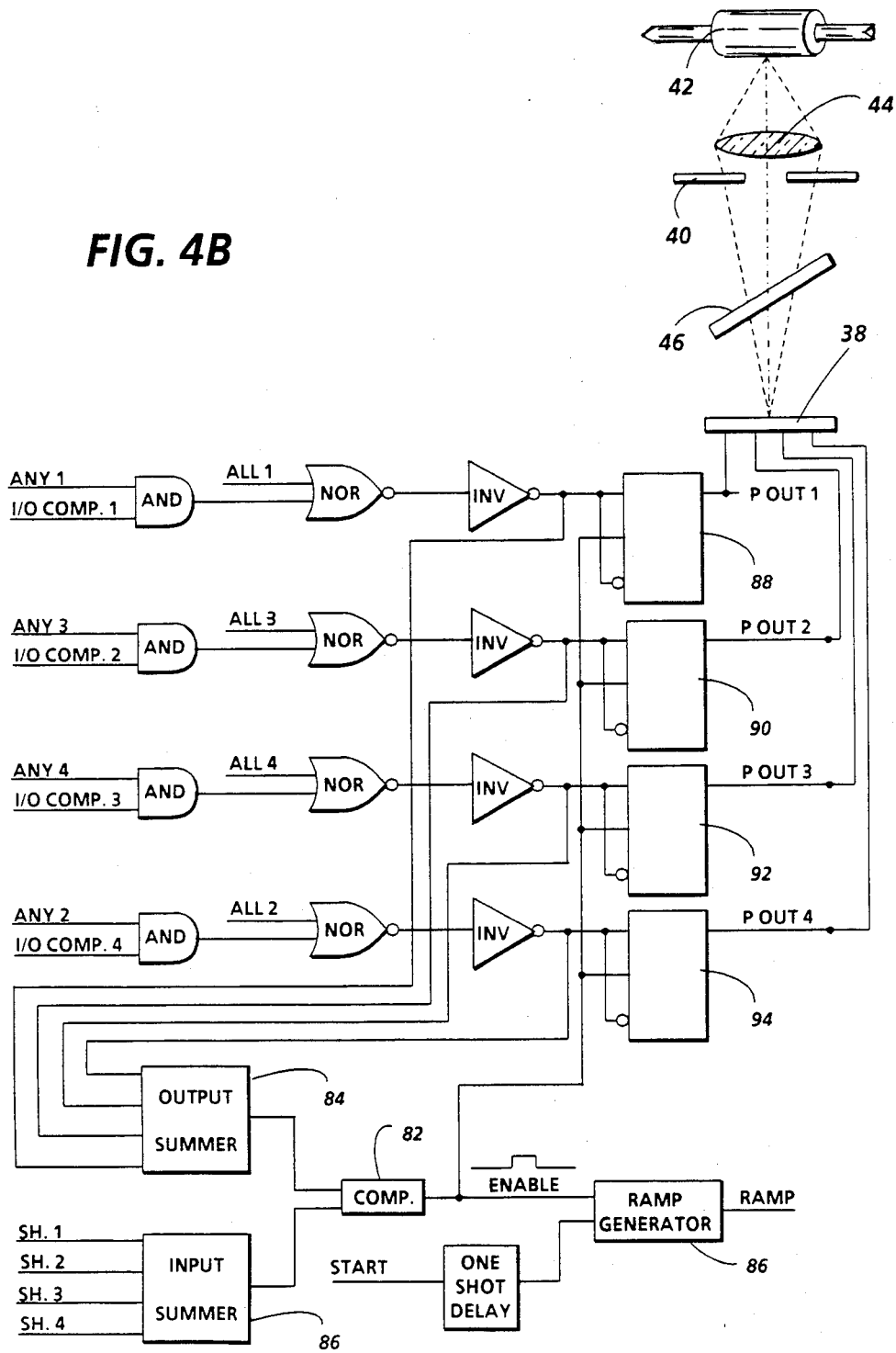

FIG. 4 illustrates a schematic diagram of the screening technique according to the present invention. Although the technique would generally be applicable to 18 to 32 or more sensor elements, only 4 sensor elements have been shown for simplicity.

Briefly, at the start of each cycle, the sensor element (sensors 1, 2, 3 and 4) (the total covers a halftone cell) are sampled and held by sample and hold circuits 72, 74, 76 and 78 respectively. The comparators respond to the four reference signals and the sensor signals to determine whether or not each sensor exceeds each specified level. For each level, the AND and NOR gates determine whether any or all inputs exceed that level. If all inputs exceed a given level, the location in the dot array is forced "on". If none of the inputs exceeds a level, the corresponding location in the dot is locked "off". This satisfies constant levels up to the minimum and down to the maximum in the input array. To provide options of not locking either minimum or maximum, the "all" lines could be grounded to avoid locking some spots "on" (this is likely to be a common mode) whereas the "any" lines could be connected to positive power to avoid locking spots off (an unlikely possibility).

Now, having handled the constant values, consider the fluctuating detail component in the input. The ramp generator 80 lowers the reference (ramp) on one set of comparators, thus causing additional outputs to turn on as the ramp voltage changes. When the output and input levels match, the comparator 82 between the output summer 84 and input summer 86 circuits triggers both the ramp generator 80 (which thereafter resets) and the flip flops 88, 90, 92, 94 (which set the output elements on or off depending on the current driver state for each). Any time after this, the output shutter is opened in a fixed cycle, exposing the output drum. After a fixed interval, the shaft encoder cycles the system for a new cycle to start and the process repeats.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. A method for creating on a light sensitive recording medium a halftone reproduction of an original image comprising the steps of:
   (a) providing an electronic signal representing the average grey scale of said original image over a halftone dot period;
   (b) providing a plurality of electronic signals representing details of said original image over said halftone dot period;
   (c) providing a halftone screen function in electronic form;
   (d) combining said halftone screen signals of (c) with said original image signals of (b) to provide a plurality of sum functions;
   (e) finding the; maximum and minimum grey scale values over said halftone dot period;
   (f) generating black or white template dots correspond to the maximum and minimum grey scale values;
   (g) placing any generated white dots in the halftone dot period;
   (h) decreasing from the allowable areas where white dots can be placed; and
   (i) locating the rest of the dots in the remainder of the halftone dot period space.

2. A method for creating a halftone reproduction of an original image by identification of constant grey components comprising the steps of:
   providing electronic signals representing the grey scale values of said original image over a halftone dot period;
   finding the maximum and minimum grey scale values over said halftone dot period;
   generating black or white or both template dots corresponding to the minimum and maximum grey scale values;
   placing any generated white dots in the halftone dot period and subtracting from the total number of half tone dots that need to be generated in the halftone period as computed from the average grey scale value;
   eliminating from the allowable areas in which white dots can be placed; and
   placing the rest of the dots in the remainder of the halftone dot period space.

3. A method for creating a halftone reproduction of a portion of an original image by identification of constant grey components comprising:
   scanning a portion of the image to determine the maximum and minimum grey scale levels within said portion,
   generating contrast dots corresponding to at least one of the maximum and minimum grey scale values;
   locating the constant dots in the portion of the image; and
   placing the rest of the dots in the remaining part of said image portion.

* * * * *